United States Patent [19]

Nishida

[11] Patent Number: 4,722,428
[45] Date of Patent: Feb. 2, 1988

[54] VIBRATION ISOLATOR FOR CLUTCH CONTROL SYSTEM

[75] Inventor: Hisato Nishida, Saitama, Japan

[73] Assignee: Honda Giken Kogyo Kabushiki Kaisha, Tokyo, Japan

[21] Appl. No.: 781,104

[22] Filed: Sep. 27, 1985

[30] Foreign Application Priority Data

Sep. 27, 1984 [JP] Japan .................................. 59-200382

[51] Int. Cl.$^4$ ............................................. F16D 19/00
[52] U.S. Cl. .................................. 192/30 V; 192/99 S
[58] Field of Search ................... 192/300, 99 S, 99 R, 192/99 A, 99 B; 74/512, 519; 188/519

[56] References Cited

U.S. PATENT DOCUMENTS

| 4,266,439 | 5/1981 | Hayashi et al. | 192/30 V |
| 4,281,753 | 8/1981 | Takemoto et al. | 192/30 V |
| 4,413,466 | 11/1983 | Beugelsdyk et al. | 192/99 S X |
| 4,454,497 | 6/1984 | Moorse | 74/512 X |
| 4,580,455 | 4/1986 | Beugelsdyk et al. | 192/99 S X |

FOREIGN PATENT DOCUMENTS 2072770 10/1981 United Kingdom ............. 192/30 V

*Primary Examiner*—Carl D. Friedman
*Assistant Examiner*—Richard E. Chilcot, Jr.
*Attorney, Agent, or Firm*—Lyon & Lyon

[57] ABSTRACT

A vibration isolator for an automobile clutch operating system having a clutch pedal in the automobile, a clutch release arm on the transmission, and an interconnecting mechanism therebetween, such as a cable, wherein a dynamic damper is mounted on one of clutch system moving components. The dynamic damper includes a damper weight and a resilient material, such as rubber, connecting the weight to the clutch system moving component.

6 Claims, 6 Drawing Figures

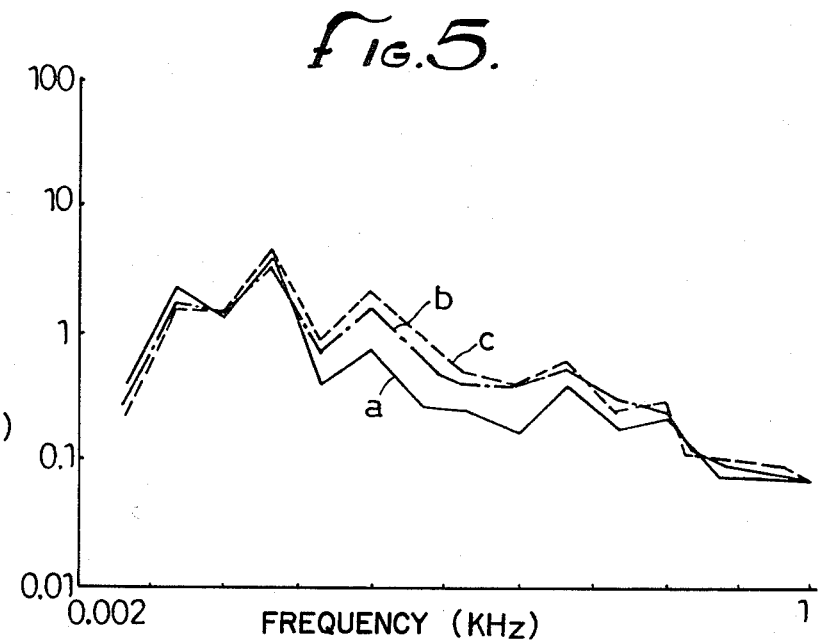
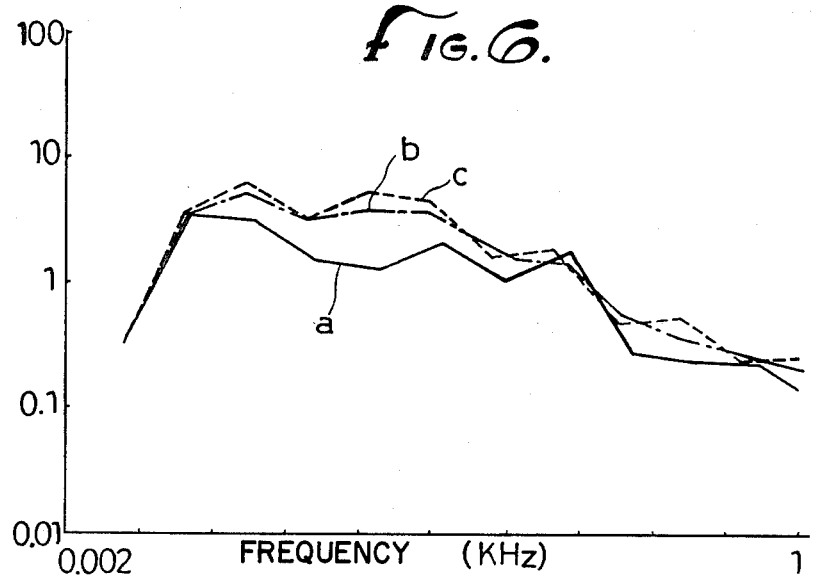

VIBRATION ISOLATOR FOR CLUTCH CONTROL SYSTEM

This invention relates to a vibration isolator for a clutch control system for use in motor vehicles and more particularly to a vibration isolator for a clutch control system of the type wherein the clutch pedal and the clutch release arm are coupled together through a cable or hydraulic type interconnecting mechanism for operating the clutch release arm by the operation of the clutch pedal.

In a motor vehicle equipped with a clutch control system of this type, the vibrations derived from the engine, the transmission and the operation of the clutch are transmitted to the inside of the vehicle via the interlocking mechanism and tend to generate noise. Various methods have been employed for reducing or eliminating that vibration. As disclosed by Japanese Utility Model Appln. Laid-Open Gazettes No. 5570318 and 59-62034, there has been employed the method of coupling the interconnecting mechanism from the clutch pedal to the clutch release arm through resilient material to allow the resilient material to absorb vibration, and according to Japanese Utility Model Laid-Open Gazette No. 55-136630, the method of attaching a damper weight to the interconnecting clutch cable to suppress vibration. The problems inherent in the prior art include, in the case of the former, the fatigue and deterioration of the resilient material caused by the repeated operation of a clutch because the physical operating force for the clutch is transmitted through the resilient material. In the case of the latter, the necessity of using a relatively heavy damper weight creates problems of cost and weight.

An object of the present invention is to provide a durable, light-weight and inexpensive vibration isolator for an automotive clutch control system.

A further and more detailed object of this invention is to provide a dynamic damper prepared from a lamination of damper weight and resilient material to any moving member of the clutch control system, including the clutch pedal and the clutch release arm, with the resilient material between the weight and the moving member.

FIGS. 5 and 6 are graphs of vibration characteristics of the clutch control system at two different engine speeds, namely, at 4,000 r.p.m. in FIG. 5 and 5,000 r.p.m. in FIG. 6.

Figure 1:
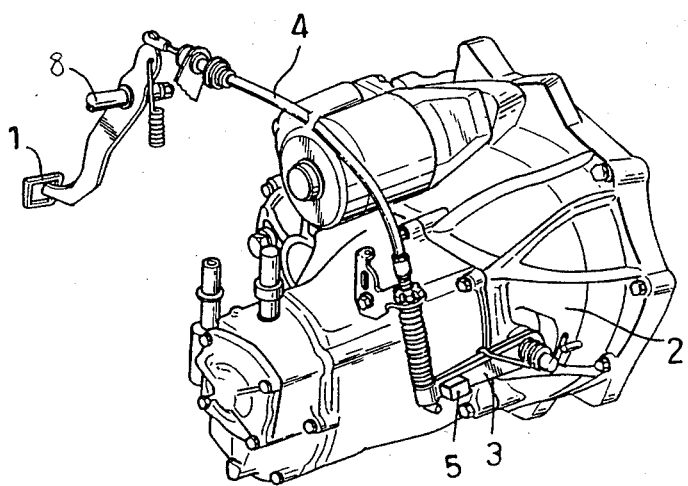
FIG. 1 is a perspective view of an automotive transmission and the clutch operating control system with the vibration isolator of this invention.

Referring now to FIG. 1 of the drawings, there are shown a clutch pedal 1 provided in the inside of a motor vehicle and a clutch housing 2 provided in the engine room. A clutch release arm 3 is provided on the outer surface of the housing 2 via a shaft for operating the clutch by pivoting. The pedal 1 and the arm 2 are coupled together via a cable type interconnecting mechanism 4 whereby the clutch within the housing 2 is operated by the rotation of the arm 3 in response to the operation of the pedal 1 through the mechanism 4.

According to the present invention, a dynamic damper 5 is attached to any one of the moving members of the clutch control system including the pedal 1 and the arm 3. As shown in FIG. 1, in the preferred embodiment the damper 5 is attached to the arm 3.

Figure 2:
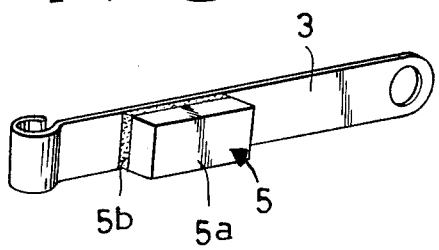
FIG. 2 is an enlarged perspective view of the clutch release arm and vibration isolator shown in FIG. 1.
Figure 3:
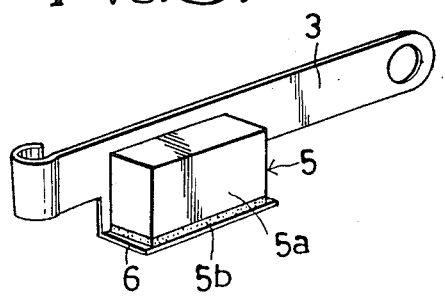
FIG. 3 is a perspective view similar to FIG. 2 illustrating a modification of the embodiment of FIG. 2.

FIGS. 2 and 3 show the damper arrangement illustrated in FIG. 1 and described above in detail wherein the dynamic damper 5 is prepared from a laminated resilient material 5b, such as rubber, formed on a damper weight 5a and fastened to the outer face of the leading end of the arm 3 or a bracket 6 protruding from the leading end of the arm 3.

Figure 4:
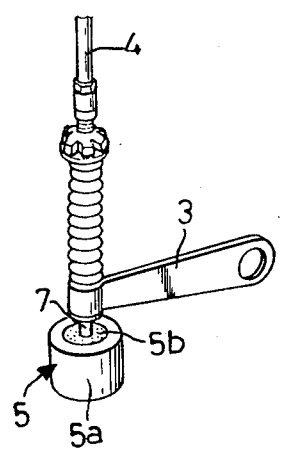
FIG. 4 is a perspective view of another embodiment of this invention.

In the alternative embodiment shown in FIG. 4, the damper 5 is in a cylindrical shape and may be fastened tightly to the pin extending from the coupler 7 of the interconnecting mechanism 4 relative to the arm 3 through the resilient material 5b. As still another alternative embodiment, the damper may be attached to the pedal 1 in such a manner (not illustrated) that the damper is close to the connection of the pedal 1 with the interconnecting mechanism and above the shaft support 8 on the vehicle body to prevent vibration from reaching the shaft support 8.

By locating the damper 5 at the leading end of the arm 3 where the vibration amplitude is the greatest in the clutch control system, the dynamic damper will be effective even though a very light weight 5a is used. Accordingly, it is advantageous in terms of weight and cost.

Further, the present invention is applicable to a clutch control system employing a conventional hydraulic interconnecting mechanism designed to operate the clutch release arm through a hydraulic release cylinder actuated by means of the oil pressure produced by a master cylinder operated by the clutch pedal. In this case, the dynamic damper is also attachable to parts other than those described in connection with the embodiments above, such as the piston rod of each hydraulic cylinder.

The effects of the present invention now will be described in detail. When the clutch release arm 3 is vibrated because of the vibration of the engine and transmission, the vibration of the former normally is transmitted to the clutch pedal 1 through the interconnecting mechanism 4 and becomes a source of noise. However, by attaching the dynamic damper 5 to any one of the moving members of the clutch control system including the pedal 1 and the arm 3 according to the present invention, the vibration of the moving member equipped with the damper 5 will be attenuated by the effect of the dynamic damper and prevented from being transmitted, whereby noise will be reduced.

In connection with the embodiment of FIG. 1, a weight 5a, as the dynamic damper 5, weighing 100~150 gm. with a natural vibration of 200~700 Hz was used to measure the vibration spectrum of the clutch release arm 3 at the time of the operation of the clutch with the engine speed being 4,000 rpm and 5,000 rpm. Line "a" of FIG. 5 shows the results obtained at 4,000 rpm and line "a" of FIG. 6 shows the results obtained at 5,000 rpm. In FIGS. 5 and 6 the "Vibration Acceleration of the Clutch Release Arm" is in gravity acceleration units (32 ft/sec/sec, 9.8 m/sec/sec) and also corresponds to vibration levels, with each increment (i.e. 0.1 to 1.0) equaling 20 dB. The "Frequency" of the vibrations are plotted relative to the levels.

Lines b in FIGS. 5 and 6 are for the case where a combination of a weight having the same weight as that of the weight 5a and the clutch release arm 3 are directly combined together without the resilient pad 5b. Lines c signify a vibration spectrum in the case where no damper weight is provided.

As is obvious from FIGS. 5 and 6, the vibration acceleration of the arm 3 when the dynamic damper 5 is attached was reduced over a wide range of frequency band and the vibration level was decreased by more than 10 db as compared with the case of no damper. On the other hand, the vibration level was decreased only by roughly 2~3 db in the case where the damper weight was directly connected to the arm 3.

As set forth above, the transmission of vibration in a clutch control system is suppressed by arranging a dynamic damper on a moving member of a clutch control system. Since the damper weight is supported through resilient material and the operating physical force for the clutch is not imposed on the resilient material, the durability thereof is improved. Moreover, the damper weight may be made lightweight as compared with the case where it is directly fastened to the moving member, so that the vibration isolator may be made lightweight and inexpensive.

What is claimed is:

1. A vibration isolator for a clutch control system having moving members including a clutch pedal, a clutch release arm and an interconnecting mechanism between the clutch pedal and clutch release arm, comprising a damper weight and a resilient means, and means connecting the resilient means to said clutch release arm and to said damper weight for resiliently and freely supporting said damper weight solely from said clutch release arm for attenuating the magnitude of free vibration of said clutch release arm.

2. The vibration isolator of claim 1 wherein said damper weight has a flat side of substantial size, and said resilient means is a thick layer of resilient material having one side mounted on and substantially coextensive with said flat side and another side mounted on the clutch release arm.

3. The vibration isolator of claim 2 wherein said layer of resilient material is parallel to a normal direction of movement of said clutch release arm during operation of the clutch control system.

4. The vibration isolator of claim 2 wherein said layer of resilient material is perpendicular to a normal direction of movement of said clutch release arm during operation of the clutch control system.

5. The vibration isolator of claim 1 wherein said damper weight is in the form of a ring and said resilient means is in the form of a smaller ring mounted inside said damper weight, said resilient means having a central hole, and means rigidly connecting the central hole of the resilient means directly and solely to said clutch release arm.

6. A vibration isolator for an automotive clutch operating system having moving members including a clutch release arm, comprising a resilient means connected directly to said clutch release arm, and a damper weight connected directly to and supported by said resilient means for resiliently dampening vibrations of said clutch release arm by attenuating the magnitude of free vibration of that said at least one moving member.

* * * * *